United States Patent [19]

Weston

[11] Patent Number: 4,487,645

[45] Date of Patent: Dec. 11, 1984

[54] SHEET CARRIER FOR TRACTOR-FEED PRINTERS

[76] Inventor: Colin K. Weston, 1606 Springwell Ave., Mississauga, Ontario, Canada, L5J 3H9

[21] Appl. No.: 514,466

[22] Filed: Jul. 18, 1983

[51] Int. Cl.[3] .................................................. B32B 1/00

[52] U.S. Cl. .................................... 156/157; 156/289; 156/300; 271/275; 198/844

[58] Field of Search ............... 156/157, 158, 502, 277, 156/552, 502, 289, 300-301, 297, 298; 198/645, 694, 715, 844, 847; 271/204, 275, 277; 282/11.5 R, 11.5 A, 22, 23

[56] References Cited

U.S. PATENT DOCUMENTS 1,288,252 12/1918 Staley .................................. 271/275
2,922,645 1/1960 Hurlbut ........................... 198/844 X
3,387,307 6/1968 Blaty ............................... 156/289 X
4,207,579 6/1980 Gamblin .
4,335,845 6/1982 Dierks .

FOREIGN PATENT DOCUMENTS 536628 5/1941 United Kingdom ........... 282/11.5 R

*Primary Examiner*—David Simmons
*Attorney, Agent, or Firm*—Donald E. Hewson

[57] ABSTRACT

Prior art methods of transporting sheets of paper such as letterhead sheets through tractor-feed printers have included the use of glue, and of vacuum, to hold the sheet onto a carrier. (The carrier has a series of holes along each of its edges characteristic of the tractor-feed system.) Pockets formed by folding the carrier have also been proposed. Disclosed is an improved carrier where the pockets are formed simply and inexpensively by the double thickness band caused by the overlapping of pieces of the carrier. This manner of forming the pockets lends itself to the provision of an endless-loop type of carrier, since the final joint between pieces can be made after the carrier has been fed through the tractor rollers of a tractor-feed printer. The pieces of the carrier may be plastic or paper and may be disposable after use or re-usable depending on the type of adhesive used.

19 Claims, 5 Drawing Figures

SHEET CARRIER FOR TRACTOR-FEED PRINTERS

FIELD OF THE INVENTION

This invention is in the field of devices for increasing the scope of usefulness of computer printing machines. The invention provides a carrier by the use of which individual sheets of paper, such as letter-headed sheets, may be conveniently printed in a printer, particularly a tractor-feed printer.

PRIOR ART

In U.S. Pat. No. 4,335,845 (DIERKS, June 22, 1982) combined letter/envelope sheets are attached to a fan-fold carrier. The carrier has the characteristic holes along its edges that are associated with tractor-feed transport. The letter/envelope sheets are attached with adhesive to the carrier.

In U.S. Pat. No. 4,207,579 (GAMBLIN, June 10, 1980) papers are held against a location stop on a moving belt by means of a vacuum which sucks the paper onto the belt via holes in the belt.

In IBM Technical Disclosure Bulletin Vol. 2 No. 2 August 1959, page 24, in the article entitled CONTINUOUS FORM WITH INSERT POCKET by J. V. Sharp, a carrier has periodic folded-over areas which define pockets, into which individual sheets may be inserted. A pocket formed by folding in that way tends to open out, and has little inherent tendency to grip the sheet. The carrier is tractor-fed.

BRIEF DESCRIPTION OF THE INVENTION

The invention provides pockets for holding a sheet of paper onto a carrier which can be fed through a computer printer. For the purposes of the invention, a carrier assembly for a tractor-feed printer is the strip of material that has the rows of holes along its edges for engagement with the teeth of the drive roller. The two surfaces of the carrier are termed the outside surface and the inside surface, and it is the inside surface which is in contact with the tractor roller, and the outside surface that faces the printing head of the printer. In the invention, the pockets are part of the carrier assembly, and a pocket is formed by providing a double thickness of the material of the carrier. The double thickness occupies a band that extends across the carrier. The width of that band, measured in the direction of travel of the carrier, is in two contiguous portions: over one portion of the width, the two thicknesses of the material lie flat against each other and are firmly adhered together, whereas over the other portion of the width, the two thicknesses lie flat against each other, but do not adhere to each other. It is arranged that, in use, the sheet of paper may be placed between the two thicknesses where they do not adhere together.

The fact that the two portions of the width of the double thickness band are side-by-side means that the non-adhered portion is affected by the adhered portion: the deeper a paper is inserted between the thicknesses, the more tightly it will be gripped between the thicknesses.

A mouth of the pocket is created at the edge of the non-adhered portion of the band, and it is arranged that the mouth is accessible from the outside surface of the carrier. As the carrier travels over the tractor roller, the mouth of the pocket is forced open slightly, so that a person may readily remove a printed sheet that is in the pocket, and replace it with a fresh sheet. It is arranged that the pocket is on the leading end of the sheet, i.e., that the sheet trails back from the pocket as the carrier moves through the printer.

The double thickness band of the carrier may be formed in two ways. First, the carrier comprises a continuous sheet, and strips of extra material are glued on, the adhesive occupying only a portion of the width of the double thickness band. Second, the carrier itself comprises a series of pieces which are joined together: the pieces overlap at the joints to form the double thickness and again the adhesive occupies only a portion of the width of the double thickness band.

If the material of the carrier is plastic rather than paper, then the two thicknesses may be joined by welding or fusing rather than by adhesive.

Besides the provision of the pocket, the invention provides a further refinement in extending the range of usefulness of tractor-feed printers. The carrier in GAMBLIN is an endless loop, which is arranged to be slipped over the ends of the drive rollers. A characteristic of tractor-feed printing machines, however, is that there is no access to the ends of the tractor rollers: whatever carrier or paper is to be printed must be entered tangentially of the roller. In DIERKS and IBM, the carrier is not an endless loop, because there is no access to the ends of the rollers. Carriers such as those that DIERKS and IBM show have had to be very long to be useful: if the carrier were short, the operator would be continually having to re-thread the carrier onto the tractor rollers.

The refinement of the invention is aimed at providing a tractor-feed sheet-carrier that can be tangentially inserted into the tractor rollers, and yet the carrier is in the form of an endless loop, so that the carrier keeps on being used over and over. In the invention, the carrier comprises a strip formed first with ends: one end is inserted in the tractor roller, then the other end is looped over and secured to the said one end with adhesive to form an endless loop. It is recognized in the invention that the manner of securing the two ends together can be very easily arranged to produce a pocket, without the need for any special folding, nor punched out shapes, nor separate inserts. Furthermore, the pocket thus formed is inevitably arranged to have a gradually narrowing or tapering depth so that an individual sheet of paper inserted in the pocket is gripped and securely held by the taper.

The gripping action that is provided by the tapering depth of the pocket may be enhanced as follows. The glue itself has a finite thickness, and so over the non-adhering portion of the band, the glue will tend to hold the two thicknesses slightly apart and not allow them to lie quite flat against one another. In the invention, therefore, it is preferred to provide a thickness of glue over the whole width of the band, and then to disable the glue in the non-adhering portion of the band. In this way, the two thicknesses lie in definite contact with each other, but without adhering. Disabling the glue can be achieved by sprinkling the glue with talcum powder or french chalk in the area where it is to retain its thickness, but not its adhesion. In fact, the powder provides a slight roughness to the surface of the glue that further enhances its grip; and the grip is yet still further enhanced by the fact that the presense of the powder actually makes the layer of glue effectively thicker in the non-adhering portion than in the adhering portion.

The carrier of the invention may be made up of several identical strips; as many as required are each fixed to their neighbouring pieces with the adhesive. The final joint is made after the pieces have been fed through the tractor rollers. The strips, being of a standard size, may be easily stored ready for use. Versatility is provided, in that the loop length of the endless carrier may be varied to suit an application by joining more or fewer of the strips.

The adhesive used is preferably of the kind that, though firmly sticking the strips together, allows the strips to be peeled apart. The carrier can thus be opened out to allow its removal from the drive rollers. The adhesive is preferably also of the type that can be re-used, so that after the strips have been removed from the printer they may be separated, stored, and used again to make up a new carrier.

In the invention, the carrier, or the strips of the carrier, may be made of paper. In this case, the adhesive need not be of the type that can be re-used because the paper would be inexpensive enough that the carrier may be torn free from the drive rollers after use and discarded. On the other hand, reusable adhesive, of course, would allow the paper to be reused, until it deteriorated.

Alternatively, the carrier, or the pieces of the carrier, may be made of robust plastic, with adhesive that is good for dozens of re-applications providing it is kept clean. Whether made of paper or plastic, the pockets for holding the individual sheets may be formed simply by the overlap at the joints between the pieces.

The carrier can be made as a length which when inserted into the printer can be formed into an endless loop to carry several sheets of paper, one behind the other. The ends can be joined by abutting them and laying a pre-glued strip over the butt joint. The strip includes a non-adhering portion, which is formed by disabling the glue over that portion. Other such strips can be stuck to the carrier sheet at appropriate intervals to form pockets to take the papers even though there is in this case only one joint to be made.

DETAILED DESCRIPTION OF PREFERRED EMBODIMENTS

The invention will now be further described by way of example, with reference to the accompanying drawings.

Figure 1:
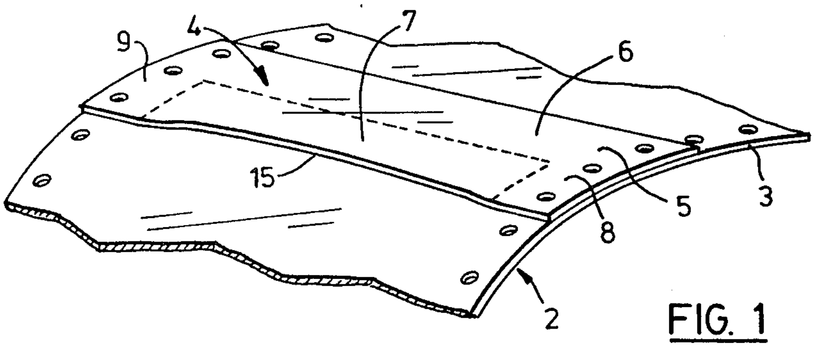
FIG. 1 is a section of a carrier assembly having a pocket.

In FIG. 1, a carrier assembly 2 comprises a single carrier sheet 3 of the appropriate length. Every so often, a double thickness band 4 is provided, only one of which is shown. The band 4 is of double thickness because of a strip 5 that is glued to the carrier sheet 3.

Not all of the strip 5 is glued to the carrier sheet 3; only about half of the strip 5 (the portion 6 in FIG. 1) adheres to the sheet 3. The band 4 is thus divided into two side-by-side portions, the adhering portion 6 and the non-adhering portion 7. Right at the edges of the sheet 3, however, the strip 5 is glued down to the carrier sheet 3 over its whole width. The non-adhering portion 7 therefore does not extend right across the carrier sheet 3. The glued side portions 8, 9 leave an unglued space 15 between them that is a little longer than the width of a sheet of paper that is to be carried in the carrier.

Figure 2:
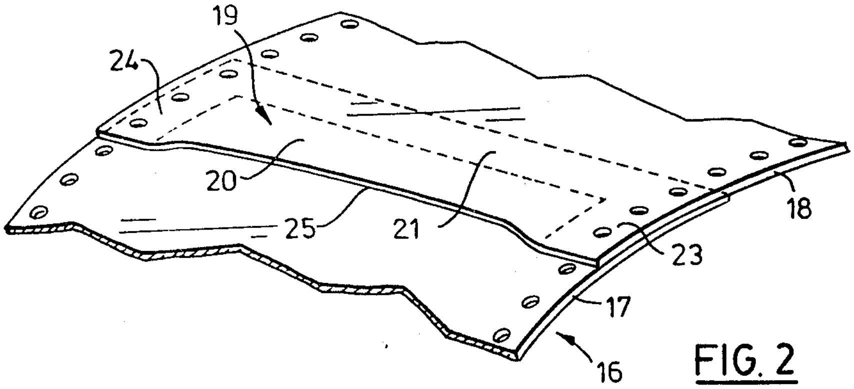
FIG. 2 is a section of another carrier assembly with a pocket.

In FIG. 2, the carrier assembly 16 is made up not of one long sheet, as was the case with the sheet 3 in the carrier assembly of FIG. 1, but of a series of shorter pieces, two of these 17, 18 being shown in FIG. 2. The double-thickness band of the invention is the band 19, now comprising the overlap of the piece 18 over the piece 17. Again, only in the portion 19 are the two pieces 17, 18 glued together: in the other portion 20 the two pieces simply lie against each other. Again, side portions 23, 24 are glued over the whole width of the band 19, to create an unglued space 25 for receiving a sheet of paper.

Figure 3:
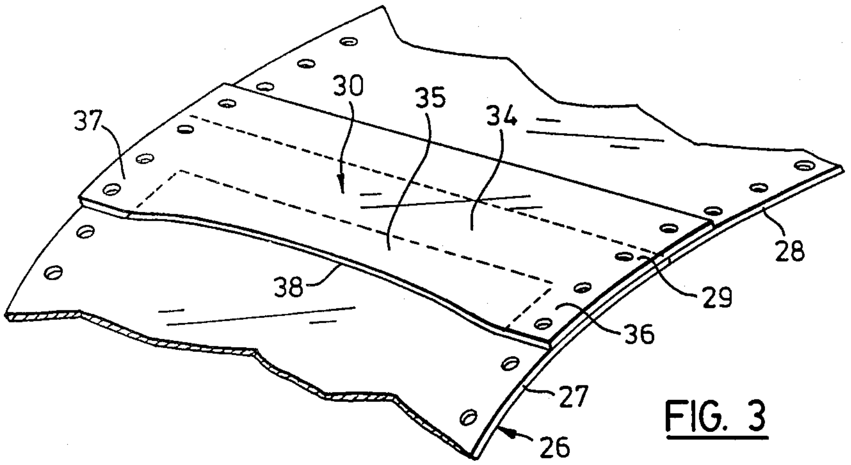
FIG. 3 is a section of yet another carrier assembly with a pocket.

In FIG. 3, the carrier assembly 26 comprises a series of short pieces, two of which 27,28 are shown, as did the carrier assembly 16 in FIG. 2. The pieces 27,28 now do not overlap but their ends butt together, and a strip 29 straddles the line of abutment. The strip 29 thus combines with the carrier pieces 27,28 to form the double-thickness band 30 of the invention, the band 30 being, as usual, divided into an adhering portion 34 and a non-adhering portion 35. The adhering portion 34 is of a greater width than were the adhering portions 6,19 in the carrier assemblies of FIGS. 1 and 2, because the adhering portion 34 has also to serve the purpose of holding the pieces 27,28 in abutment. Again, side portions 36,37 are glued over the whole width of the band 30, to create an unglued space 38 for receiving a sheet of paper.

To avoid the need for more than one width of strip, the same wider strip as is used to form the butt joint may be used to form pockets elsewhere on the carrier sheet, even though its extra width would not then strictly be needed.

The unglued spaces 15, 25, 38 constitute the mouths of pockets in the carrier assembly that are created by the unglued overlapping portions of the double thickness bands 4, 19, 30.

Having described a number of ways in which the paper-carrying pockets may be formed by the double-thickness bands of the invention, the manner of use of a carrier assembly having those pockets will now be described.

Figure 4:
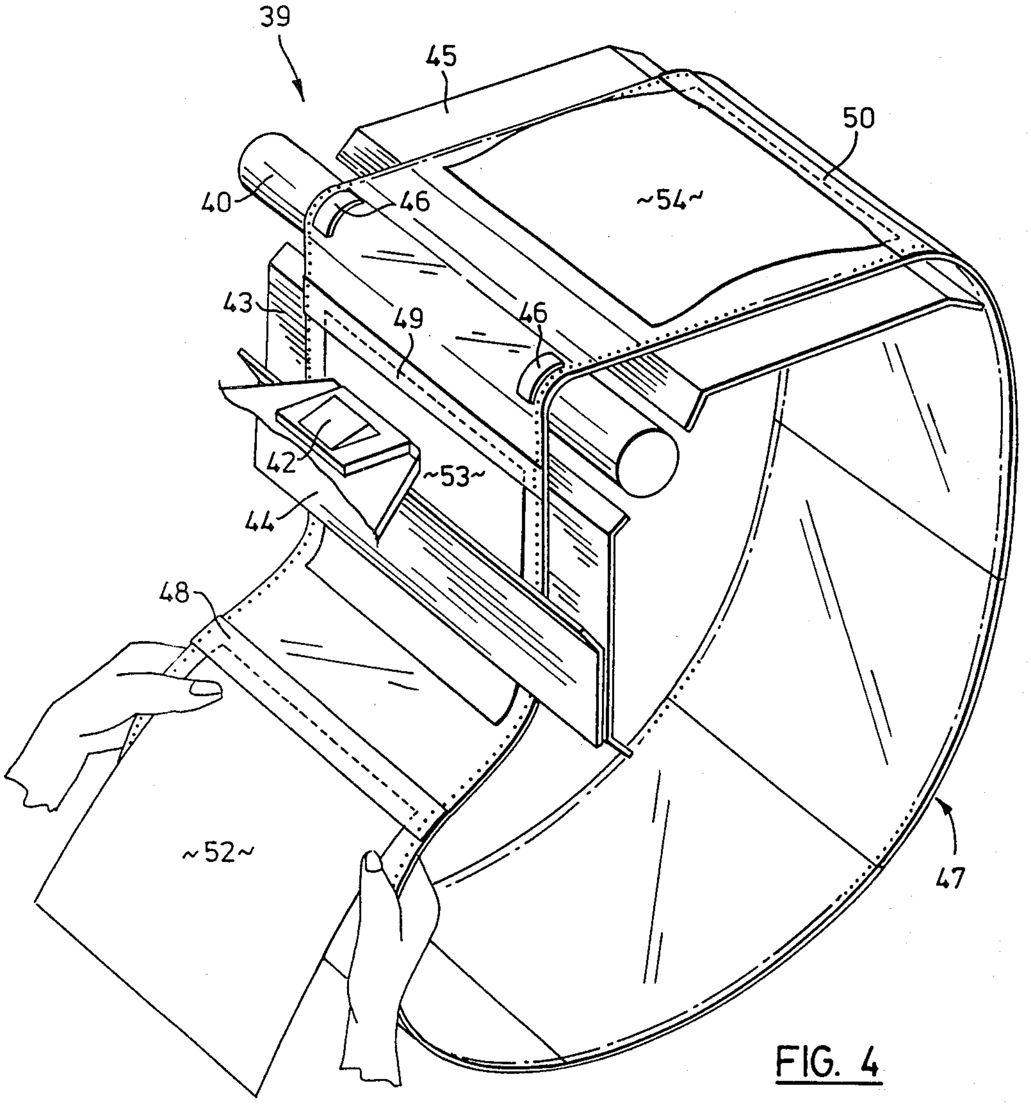
FIG. 4 is a pictorial diagrammatic view of how a carrier assembly is used in conjunction with a computer tractor-feed printer.

In FIG. 4, a tractor-feed printer 39 has tractor rollers 40 with drive teeth. A printing head 42 is arranged to strike against a platen or abutment 43. An entry guide 44, an exit guide 45, and retainers 46, locate the material that is to be printed as it passes through the printer.

A carrier assembly 47 has pockets 48, 49, 50. A person is seen inserting a sheet of paper 52 into the pocket 48. A sheet 53 in the pocket 49 is being printed. As the carrier assembly passes beyond the exit guide 45 it curls downwards, which causes the pocket 50 to open slightly. A person may remove a printed sheet 54 from the pocket 50, therefore, without difficulty.

If the carrier were in the form of a continuous sheet, such as that illustrated in FIG. 1, then the carrier would need to be very long, or the person would have to keep on re-threading it through the printer. Preferably therefore the carrier is in the form of an endless loop as shown in FIG. 4. To assembly such an endless loop onto the printer, the carrier 47 is first built up in one of the manners previously described, but with ends. One of those ends is fed through the printer 39, tangentially to the tractor rollers 40; this end is then joined to the other end to form the endless loop.

Figure 5:
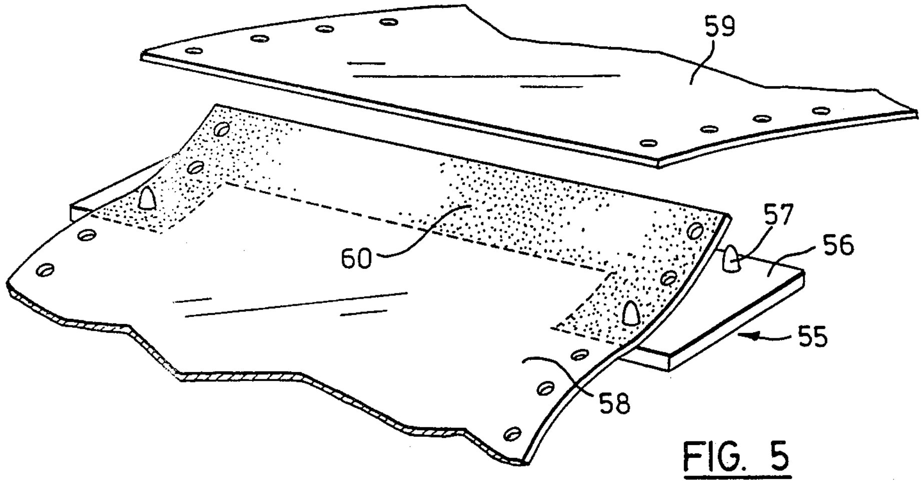
FIG. 5 (which is found with FIG. 3) is a pictorial view of an assembly aid, in use.

The assembly aid 55 shown in FIG. 5 comprises a base 56 on which are set pegs 57 of the same spacing and pitch as the drive teeth on the roller 40. Pieces 58,59 of the carrier assembly may be joined using this aid 55 to ensure a precise location. An area of contact adhesive 60 is provided on the piece 58, normally protected by a backing strip which has been removed. The other piece 57 is lowered onto the glued area 60, and pressed to firmly activate the adhesive.

The carrier assembly may be made of plastic or paper. The glue used may be of the contact-adhesive type that allows the ends of the carrier to be peeled off and re-used. especially when the carrier is of plastic. If the carrier is of paper, it may be inexpensive enough to be torn off the printer after use. It will normally be the case that the glued area, whether on the outside surface or the inside surface, will have to be protected by a backing strip, to be peeled off just before the pieces are brought together. The backing strip should be saved and re-applied to the glued area, if the piece is to be saved for re-use. To prolong the life of a particular carrier, the loop may be broken and re-made at different points.

The spacing of the pockets along the length of the carrier sheet is important. Of course, they must be far enough apart that a paper in one pocket does not overlap the next pocket; but it is advantageous if the spacing is even greater, so as to leave a substantial gap between the paper and the next pocket. This is to ensure first that even the longest individual sheet of paper will not overlap the next pocket but also to ensure that when a paper is under the printing head the paper preceding it is well clear of the printing head, for easy removal.

The carrier of the invention is mainly intended for conveying sheets of paper through tractor-feed computer printers. However, it has been found that so long as care is taken in the setting up, the carrier can be used with friction-feed printers, and even in automatic typewriters: registration can be so accurate in some cases that letters may even be over-typed.

The printer illustrated in FIG. 4 is a typical one: others might allow the sheets to be inserted and removed at the same station, which is somewhat more convenient.

The thickness of the material of the carrier is important. If it is much more than 4 mil. then the double thickness, with a paper gripped between the thicknesses, might jam in the printer. Less than 4 mil. and the carrier is probably too flimsy and liable to damage.

What is claimed is:

1. Carrier assembly, for carrying individual sheets of paper through a printer, the printer having a printing head, the assembly comprising a carrier sheet and pockets spaced along the carrier sheet;

wherein the pockets are formed by the provision of a double thickness band extending across the carrier sheet;

wherein the width of that band is in two contiguous portions, and over one portion of the width the two thicknesses of the double thickness band are firmly adhered together, and over the other portion the two thicknesses lie against each other without adhering;

wherein, over the width of the band the thicknesses are substantially not folded or creased but are flat together in such a manner that the thicknesses lie in intimate surface-to-surface contact with each other over the non-adhering other portion of the band, so as to grip firmly a piece of paper inserted between the thicknesses; and wherein the said other portion of the band is relatively narrow, being of sufficient width only to grip a narrow margin at the edge of a piece of paper inserted between the thicknesses, so as to leave almost the whole of the piece of paper open to the printing head of the printer, being a piece of paper of a size commensurate with the spacing of the pockets.

2. Assembly of claim 1, wherein the pocket is so directed that the edge of the piece of paper that is to be gripped by the pocket is the leading edge of the piece of paper as the piece is fed through the printer, and the carrier includes no other pockets for gripping any of the other edges of the piece of paper.

3. Assembly as in claim 2, wherein the carrier sheet is one continuous length of material, and wherein the double thickness band is formed by the addition to the carrier sheet of a strip of material extending across and adhering to the carrier sheet.

4. Assembly as in claim 2, wherein the carrier sheet is in several pieces, joined together by overlapping joints, and wherein the area of overlap between neighbouring pieces comprises the double thickness band.

5. Assembly as in claim 2, wherein the carrier sheet is in several pieces, joined together by butt-joints, and wherein the double thickness band is formed by the addition to the carrier sheet of a strip of material extending across the carrier sheet, and wherein the pieces are held in abutting relationship by their adherence to the strip.

6. Assembly as in claim 2, wherein the portion of the band over which the two thicknesses do not adhere does not extend across the full width of the carrier sheet, but wherein over side portions of the band, the two thicknesses of the band are firmly adhered together.

7. Assembly as in claim 2, wherein the material of the carrier assembly is plastic.

8. Assembly as in claim 2, wherein the material of the carrier assembly is paper.

9. Assembly as in claim 3, wherein the material of the carrier sheet is paper, and the material of the strip is plastic.

10. Assembly of claim 3, wherein both side edges of each piece are provided with a respective series of holes for transporting the piece through a printer, and wherein a layer of contact adhesive is disposed right across the piece, on one surface only of the piece, the layer being contiguous with an end of the piece, and having a width of about 0.6 inches.

11. Assembly of claim 3, wherein both edges of each piece are provided with a respective series of holes for transporting the piece through a printer and wherein a layer of contact adhesive is disposed right across the piece, on one surface only of the piece, the layer being about 0.6 inches in width, being parallel to the end of the piece, and being placed so as to leave an area free of adhesive about 0.6 inches wide and contiguous with the end of the piece.

12. Assembly of claim 10 wherein the layer of adhesive has side portions that extend for about 1.25 inches in from, and contiguous with, the end of the piece; the side portions extending about 0.5 inches in from, and contiguous with, the respective side edges of the piece.

13. Carrier assembly, for carrying individual sheets of paper through a printer, comprising a carrier sheet and pockets;

wherein the pockets are formed by the provision of a double thickness band extending across the carrier sheet;

wherein the width of that band is in two contiguous portions, and over one portion of the width the two thicknesses of the double thickness band are firmly adhered together, and over the other portion the two thicknesses lie against each other without adhering, and wherein the carrier sheet is in several pieces, joined together by overlapping joints, and wherein the area of overlap between neighbouring pieces comprises the double thickness band.

14. Method for enabling individual sheets of paper to be printed on a printer, comprising the steps of providing the carrier assembly of claim 13 of taking one end of the carrier sheet and feeding it tangentially into the drive-roller of the printer; and of taking the other end of the carrier sheet and looping it over and securing it with adhesive to the said one end so that the carrier sheet forms an endless loop.

15. Method of claim 13, wherein the carrier sheet is made up of several pieces, and each piece is joined to its neighbouring piece with adhesive, the final joint being made after the carrier sheet has been fed through the drive-rollers, to form an endless loop.

16. Method of claim 15, wherein the printer is a tractor-feed printer, and an assembly aid is provided, which comprises a base having pegs with a pitch and spacing corresponding to the teeth on the tractor roller of the tractor-feed printer, and wherein the pieces of the carrier sheet are aligned prior to joining them together by placing the holes in the pieces over the appropriate pegs in the aid.

17. Method for enabling individual sheets of paper to be printed on a printer, comprising the steps of providing a set of identical pre-glued strips and a single carrier sheet;

of placing the ends of the carrier sheet in abutment so that the sheet comprises an endless loop;

and of holding the ends in abutment by virtue of their both adhering to one of the strips, and of sticking the rest of the strips to the carrier sheet to form pockets at appropriate intervals.

18. Method of manufacturing pre-glued strips for us in a carrier assembly for carrying individual sheets of paper through a printer, comprising the steps of applying adhesive to the strip;

of superimposing a backing layer over the adhesive;

of peeling off a portion of the backing layer to expose adhesive;

and of sprinkling talcum powder or french chalk onto the exposed adhesive so as to substantially disable the adhesive.

19. Carrier assembly, for carrying individual sheets of paper through a printer, comprising a carrier sheet and pockets;

wherein the pockets are formed by the provision of a double thickness band extending across the carrier sheet;

wherein the width of that band is in two contiguous portions, and over one portion of the width the two thicknesses of the double thickness band are firmly adhered together, and over the other portion the two thicknesses lie against each other without adhering, and wherein the carrier sheet is in several pieces, joined together by butt-joints, and wherein the double thickness band is formed by the addition to the carrier sheet of a strip of material extending across the carrier sheet, and wherein the pieces are held in abutting relationship by their adherence to the strip.

* * * * *